United States Patent [19]

Jordan

[11] 4,338,191

[45] Jul. 6, 1982

[54] APPARATUS FOR TREATING FLUIDS

[75] Inventor: Edward J. Jordan, Willoughby, Ohio

[73] Assignee: Jet Aeration Company, Cleveland, Ohio

[21] Appl. No.: 807,930

[22] Filed: Jun. 20, 1977

[51] Int. Cl.³ .......................... B01D 57/00; C02B 3/06
[52] U.S. Cl. ..................................... 210/199; 210/206
[58] Field of Search ................ 137/268; 210/206, 205, 210/198, 199, 18, 169, 62, 61, 322; 23/267 F, 267 MS; 239/315, 414, 310, 312

[56] References Cited

U.S. PATENT DOCUMENTS

| | | | |
|---|---|---|---|
| 3,507,624 | 4/1970 | Schneider, Jr. et al. | 23/267 E X |
| 3,579,440 | 5/1971 | Bradley, Jr. | 210/18 |
| 3,595,786 | 7/1971 | Horvath et al. | 210/198 |
| 3,719,455 | 3/1973 | Ohono et al. | 23/267 MS |
| 3,912,627 | 10/1975 | Tepas, Jr. | 137/268 X |
| 4,055,494 | 10/1977 | Emmett, Jr. | 210/199 X |

Primary Examiner—Frank A. Spear
Attorney, Agent, or Firm—Woodling, Krost & Rust

[57] ABSTRACT

An apparatus for treating fluids emitted by, for instance, a septic tank comprising, a container having a fluid inlet and a fluid outlet, the container being adapted to receive an elongated, holding member, adapted for holding a supply of the treating agent and to automatically feed it downwardly into contact with the fluid to be treated as the latter flows through the container via the inlet and the outlet, and wherein vertically spaced means are provided in the container for supporting the holding member in the container and for guiding the latter into predetermined position in the container when assembled therewith; the holding member can be readily removed from the container for replenishment of the treating agent upon exhaustion thereof, and then can be reinserted back into the container. The apparatus is adapted to be buried in the ground and is provided with a removable cover means for providing access to the open upper end of the container thus providing access to the holding member. In one embodiment, an extension member is provided adapted for coaction with the container proper, for extending the height of the container to adapt the apparatus to different buried depths of associated septic tanks.

19 Claims, 32 Drawing Figures

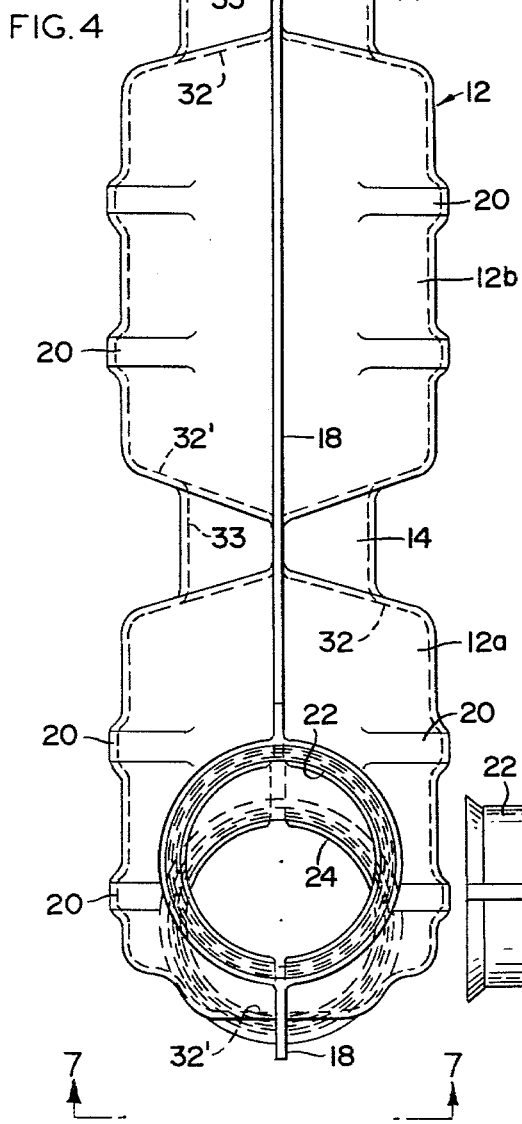
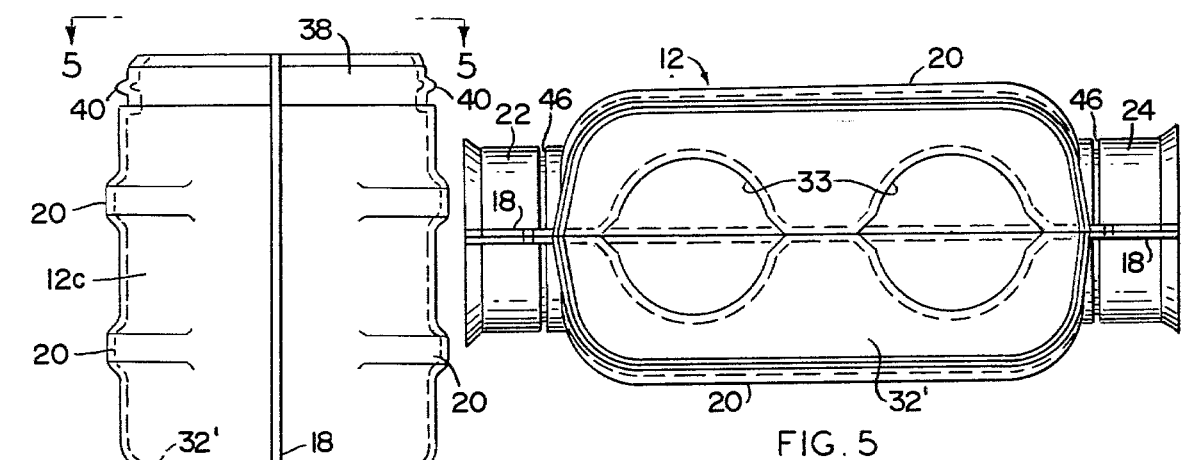
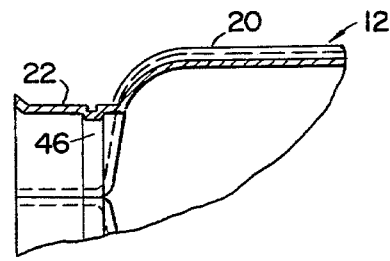
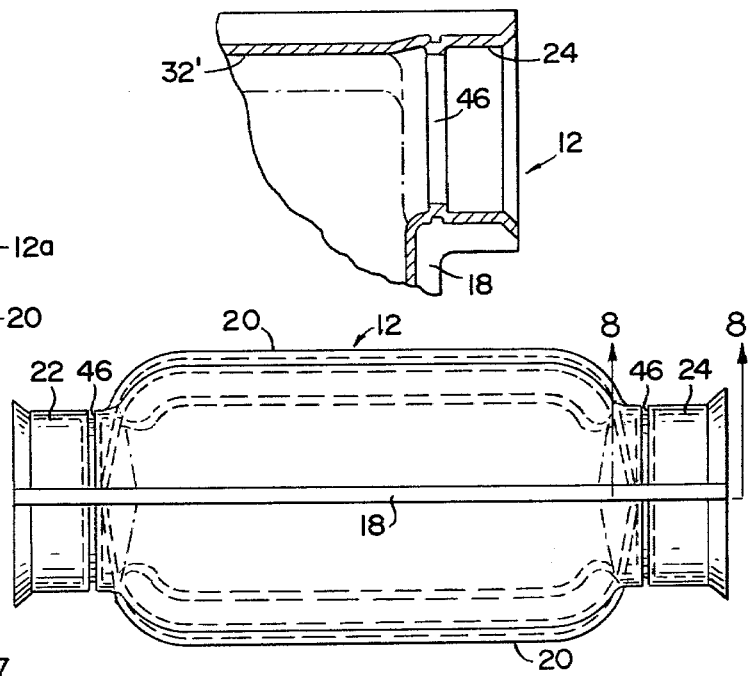

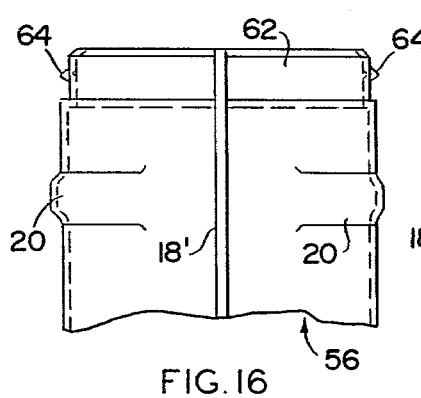
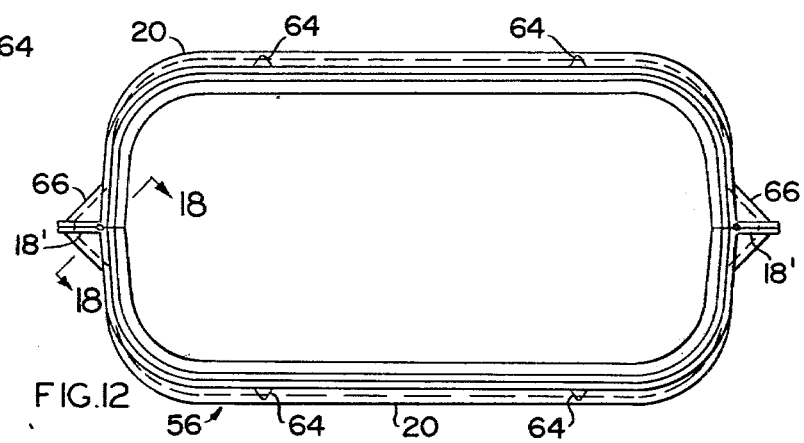
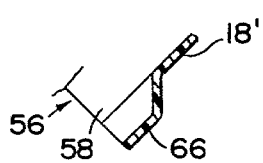
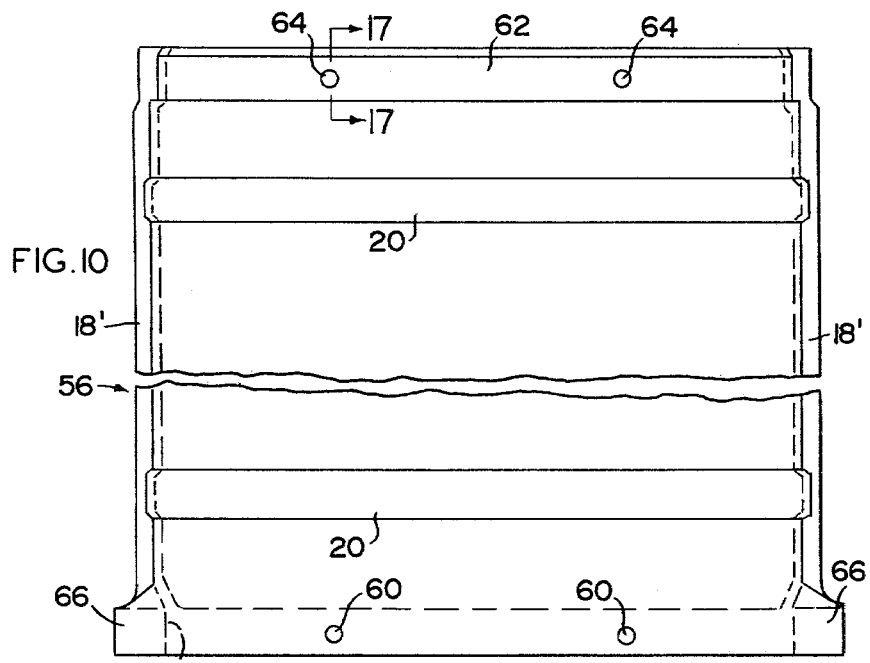
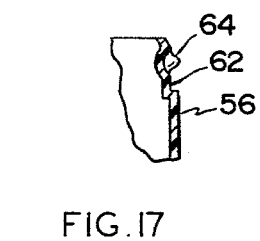
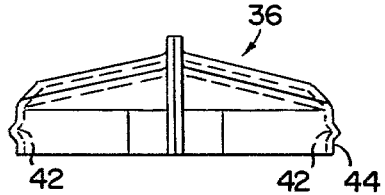
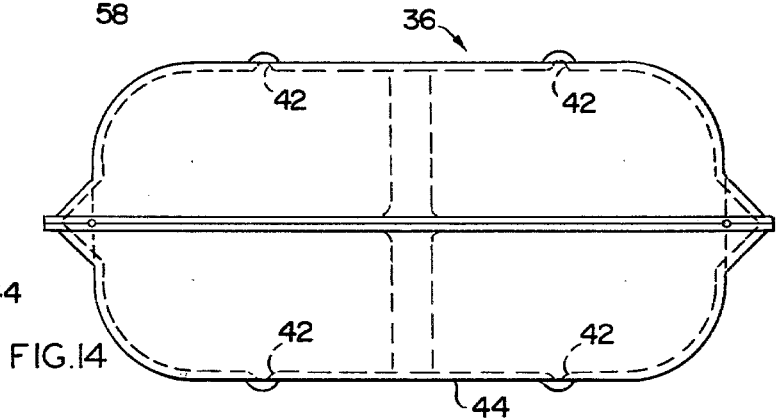
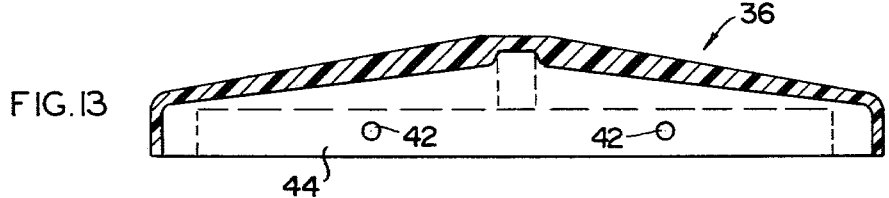

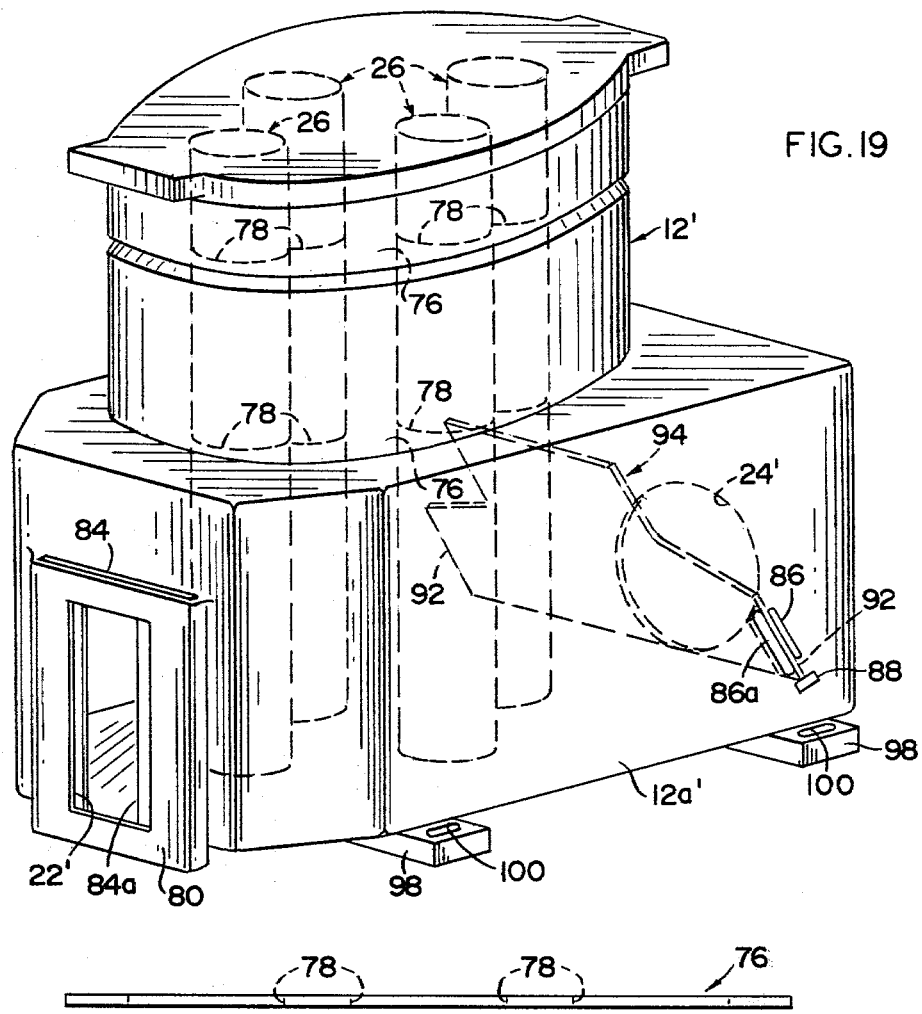
FIG. 19
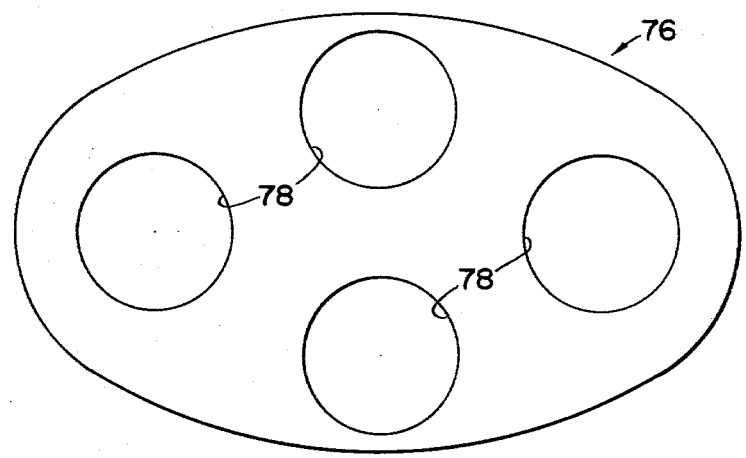
FIG. 21
FIG. 20

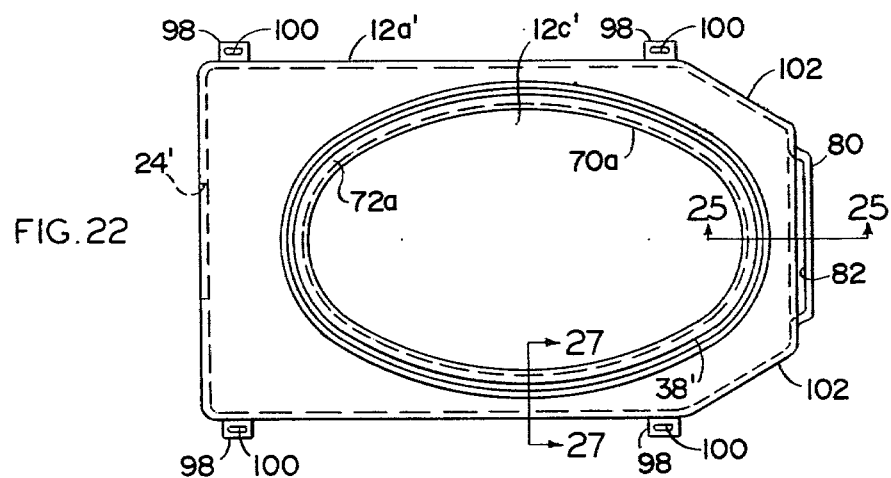
FIG. 22
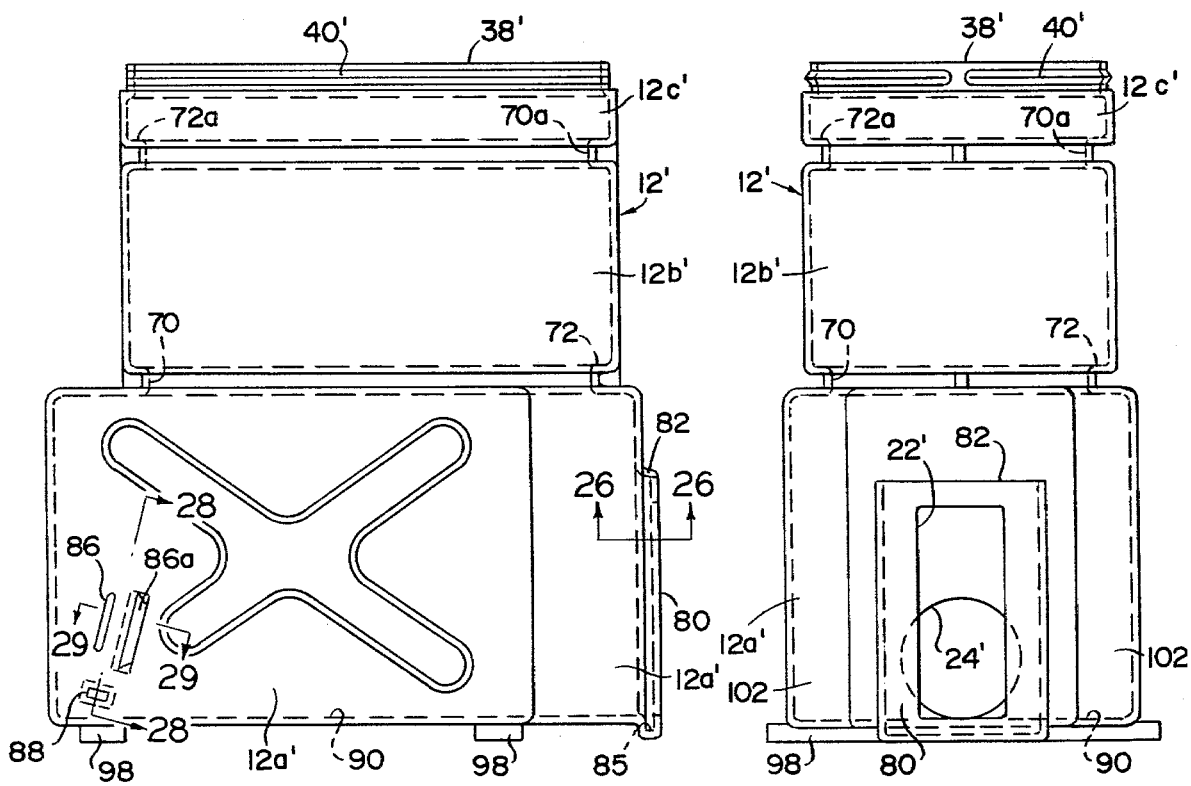
FIG. 23
FIG. 24

APPARATUS FOR TREATING FLUIDS

This invention relates in general to an apparatus for treating fluids with chemical treating agents, and more particularly relates to an apparatus of the latter type wherein the apparatus includes a treating agent holding member which is readily insertable into and removable from the container proper, with the container embodying means for supporting and guiding the holding member when it is assembled with the container.

BACKGROUND OF THE INVENTION

Apparatus for treating fluids of the general type of this invention are known in the art. One such arrangement is illustrated for instance in U.S. Pat. No. 3,595,786 dated July 27, 1971 and entitled "Apparatus for Treating Fluids". In such prior art apparatus, the holding means for the treating agent project above the container. With such an arrangement, it is generally not feasible to bury the apparatus very deeply in the ground and therefore, its applicability is limited with respect to use with fluid emitting structures which may be buried at various and considerable depths below ground level.

SUMMARY OF THE INVENTION

The present invention provides a lightweight apparatus for treating fluids with treating agents, and comprising a container adapted to receive the holder, sometimes referred to as holding means or members, for the treating agent completely within the container, with the container having a cover on the upper end thereof for providing accessibility to the holder, and wherein vertically spaced means are provided in the container for effectively supporting the holder in the container, and for guiding the holder into the container during assembly of the holder with the container. In one embodiment, an extension is provided for extending the effective height of the container, and thereby providing for the location of the container at greater and various depths below the top surface of the ground.

Accordingly, an object of the invention is to provide a novel apparatus for automatic treating of liquids or fluids.

A further object of the invention is to provide an apparatus of the above type which comprises a container having a treating agent holder disposed in the container, and completely received therein, together with vertically spaced means in the container for supporting the holder in the container, and for guiding the latter into the container during assembly thereof with the container.

A still further object of the invention is to provide an apparatus of the aforementioned type wherein the container is open at the top thereof and includes a cover for providing accessibility to the holder from ground level, when the container is buried beneath the ground.

A still further object of the invention is to provide an apparatus of the aforementioned type which includes baffle means therein for interrupting the straight-through flow of the fluid out of the outlet to the container, and which includes removable weir means coacting with the outlet, for varying the height of fluid in the container.

A still further object of the invention is to provide an apparatus of the aforementioned type which is formed of moldable lightweight plastic material.

Other objects and advantages of the invention will be apparent from the following description taken in conjunction with the accompanying drawings wherein:

BRIEF DESCRIPTION OF THE DRAWINGS

FIG. 4 is a side elevational view of the container construction illustrated in FIG. 1 taken from the inlet side thereof;

FIG. 5 is a top plan view of the container taken generally along the plane of line 5—5 of FIG. 4, looking in the direction of the arrows;

FIG. 6 is a fragmentary, sectional view showing the inlet construction of the container;

FIG. 7 is a bottom plan view of the container taken generally along the plane of line 7—7 of FIG. 4 looking in the direction of the arrows;

FIG. 8 is a fragmentary, sectional view taken along line 8—8 of FIG. 7.

FIG. 10 is a side elevational view of an extension member for assembly with the container of the FIGS. 1 through 9 embodiment, for extending the height of the container thereby providing for disposing the container at various depths below ground level;

FIG. 12 is a top plan view of the extension of FIG. 10;

FIG. 13 is a vertical sectional view of the cover adapted for use with the extension of FIG. 10;

FIG. 14 is a top plan view of the cover of FIG. 13;

FIG. 15 is an end elevational view of the FIG. 14 cover;

FIG. 16 is a fragmentary, end elevational view of the extension member of FIG. 10 which is adapted to receive thereon the cover of FIGS. 13 and 14;

FIG. 17 is a fragmentary view taken generally along the plane of line 17—17 of FIG. 10 looking in the direction of the arrows;

FIG. 18 is a sectional view taken generally along the plane of line 18—18 of FIG. 12, looking in the direction of the arrows;

FIG. 19 is a perspective view of another embodiment of apparatus embodying the invention;

FIG. 20 is top plan view of one of the supporting and guiding plates for the treating agent holders of the FIG. 19 embodiment;

FIG. 21 is a side elevational view of the plate of FIG. 20;

FIG. 22 is a top plan view of the container of the FIG. 20 embodiment, with the cover removed;

FIG. 23 is a side elevational view of the container of FIG. 22;

FIG. 24 is an end elevational view of the FIGS. 22, 23 container;

DESCRIPTION OF PREFERRED EMBODIMENTS

Figure 1:
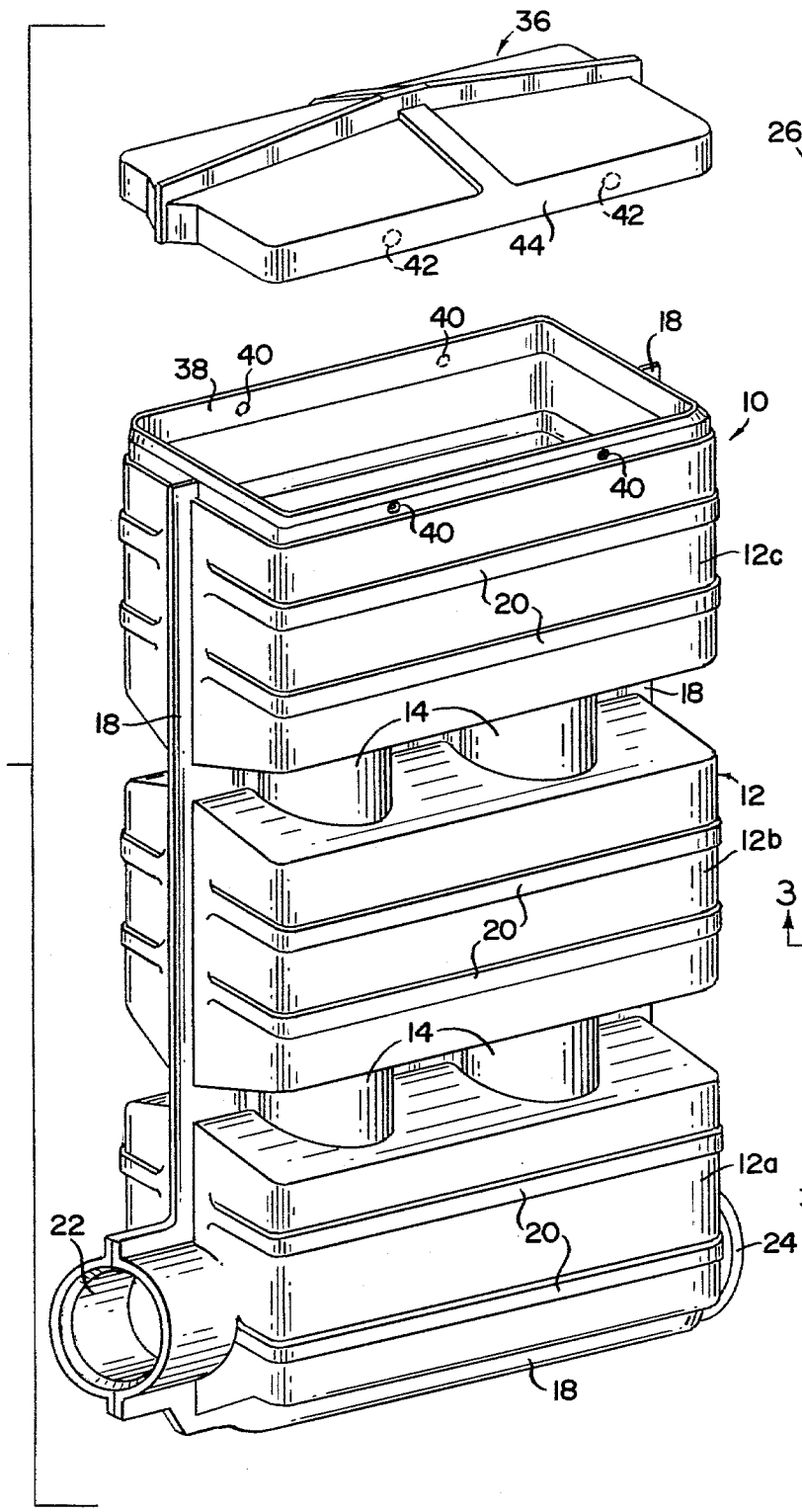
FIG. 1 is a perspective illustration of apparatus embodying the invention.

Reference 10 designates apparatus embodying the invention, which in the embodiment illustrated for instance in FIG. 1, comprises a container 12 formed of spaced chamber portions 12a, 12b, 12c connected by cylindrical-like tubular sections 14, with sections 14 being aligned vertically with respect to the overlying cylindrical section. Container 12 is preferably formed from moldable plastic material, such as for instance high density polyethylene, and includes web or rib sections 18 extending about the container for strengthening the latter. Generally horizontal rib portions 20 may also be molded into the side walls of the chambers 12a, 12b and 12c, for rigidifying and strengthening the walls thereof.

An inlet 22 is provided for entry into the lower chamber 12a, and an outlet 24 is likewise provided from the lower chamber 12a through which fluid or liquid is adapted to flow by gravity. It will be noted that inlet 22 is disposed at a higher elevation than the elevation of the bottom wall of chamber portion 12a (FIG. 4) while outlet 24 is generally coplanar with or just slightly below (FIG. 8) such bottom wall, so that good drainage of the liquid or fluid from the container is accomplished via outlet 24. Rib sections 18 are preferably disposed in the longitudinal vertical center plane of the inlet and outlet openings (FIG. 7).

Holder members 26 (FIG. 2) of elongated cylindrical-like tubular configuration are provided for holding a supply of the treating agent therein. The treating agent may be tablets of a disinfectant material which may include for instance chlorine, with the tablets being adapted to be stacked into the respective holder member 26 in magazine fashion, so that as the tablets are dissolved at the bottom of the holder member 26 due to the contact with the liquid or fluid, the tablets automatically feed down by gravity to the bottom portion of the holder member for treating the fluid or liquid. One form of available tablet is known as "Sanuril Tablets" obtainable from the Diamond Shamrock Corporation. An example of the use of the apparatus would be for instance, with a septic tank, and wherein the apparatus is adapted to treat the fluid flow from the septic tank.

Figure 2:
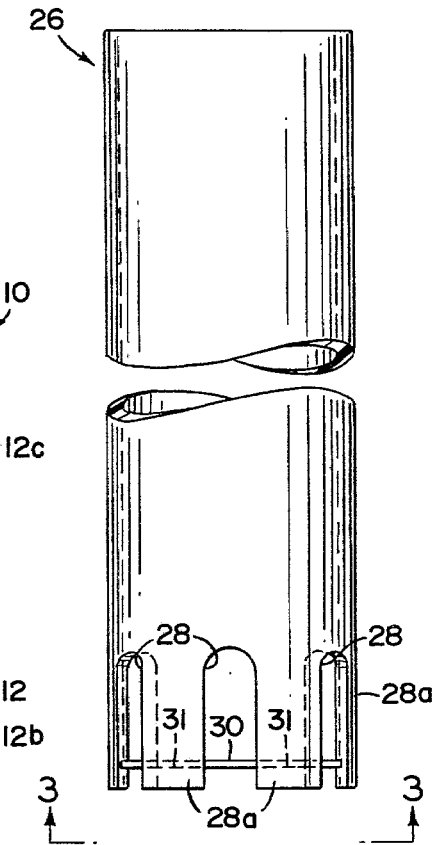
FIG. 2 is a broken, side elevational view of one of the holders for the treating agent.

As can be best seen in FIG. 2, the bottom portion of each holder 26 is preferably provided with a plurality of spaced, vertically extending slots 28, thereby defining finger portions 28a, and expeditiously exposing the tablets which are stacked in the holder 26, to the fluid or liquid flow through the inlet and out the outlet of the container 12 of the apparatus.

Figure 3:
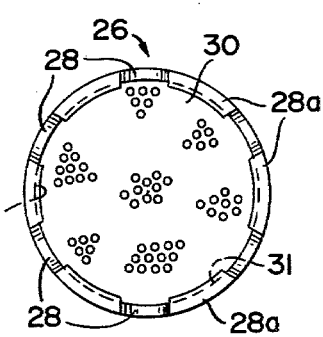
FIG. 3 is a bottom view taken along the plane of line 3—3 of FIG. 2 looking in the direction of the arrows.

The bottom portion of the holder member is preferably provided with an apertured end plate 30 (FIG. 3) which supports the treating agent thereon and yet, permits the liquid to readily flow through the plate into contact with the treating agent. Plate 30 can be mounted on the lower end of the associated holder 26 by being received in slots 31 cut or formed in the inner surface of the holder 26. As can be seen from FIGS. 1 and 4, the holder member is preferably generally in line with the plane containing the lengthwise axes of the inlet 22 and outlet 24 of the container structure.

As can be best seen in FIGS. 1, 4 and 5, the container chambers 12a and 12b include both upper and lower wall surfaces 32, 32', while container chamber 12c includes only lower wall surface 32' with the chamber being open at the top thereof. The cylindrical sections 14 extend through the associated chamber wall and provide openings 33 which are adapted to receive therethrough a respective holder member 26, when the latter is inserted into the container. The defining surfaces of openings 33 are spaced vertically with respect to one another, and provide a support for the respective holder member, when the latter is inserted into the container, and also provide for guiding the holder member down through the container into engaged position with the bottom wall 32' in chamber section 12a. As can be best seen in FIG. 4, the lower wall surface 32' of chamber sections 12c and 12b slope toward the vertical plane passing through the vertical axis of the container and the lengthwise axes of the inlet and exit openings therein. This aids in guiding the holder member into and through the associated openings 33.

Openings 33 are preferably just slightly larger than the exterior diameter of holder cylinders 26, and therefore expeditiously support the respective holder member in upright position in the container, for effective exposure of the treating agent disposed in the holder member to the fluid or liquid flowing through the container.

The open upper end of the container is adapted to be closed by means of a cover 36 (FIG. 1) which is adapted to fit generally snugly on the formed flange 38 on upper chamber section 12c. In order to releasably lock the cover 36 to the container, there is preferably provided projections 40 on the flange 38 adapted to be received in recesses 42 formed on the inner surface of the cover flange 44.

The interior surfaces of the inlet and outlet 22 and 24 are preferably provided with generally circular embossments 46, which limit the entry of an attaching conduit or pipe with the respective inlet or outlet.

Figure 9:
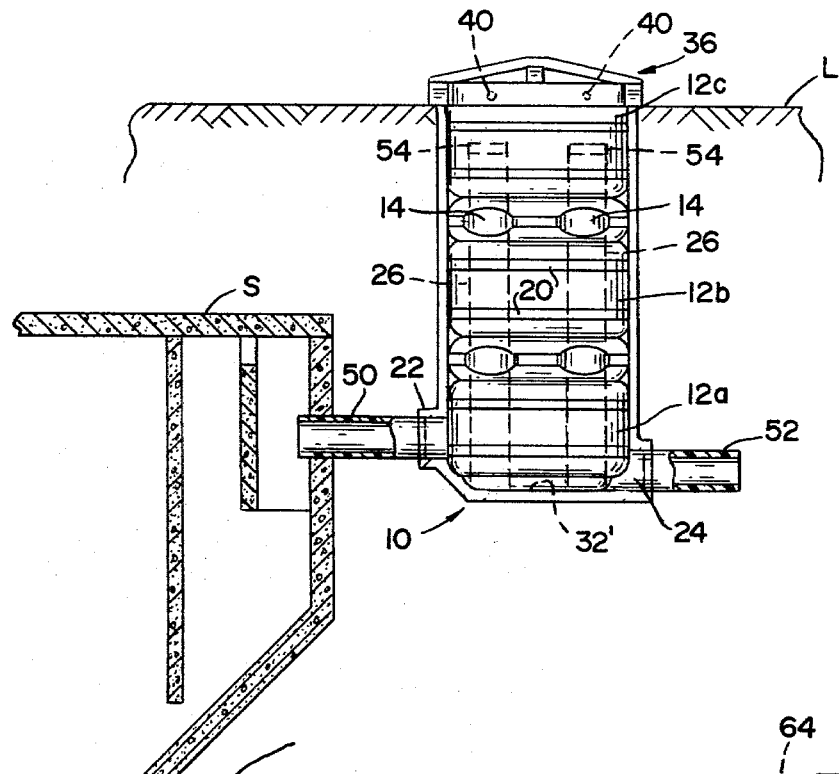
FIG. 9 is a generally diagrammatic illustration showing the apparatus embodying the invention coupled to a septic tank system, and showing the accessibility of the container of the apparatus via the cover disposed at ground level.

Referring now to FIG. 9, there is illustrated one of the mechanisms of the invention embodying the invention associated with a septic tank S, so that the fluids coming out of the septic tank via pipe 50 are passed or flow by gravity through the inlet 22 of the container 12, to be treated by the treating agent positioned in the holder members 26 in the container. As can be seen, the holder members rest on or engage the bottom wall of the container chamber 12a, and since the holders at their lower ends are slotted, the fluid or liquid is expeditiously exposed to the treating agent resting on aperture plate 30 of the respective holder. The liquid being treated flows by gravity through the container and out the outlet 24, and outlet pipe 52, where it may be directed to another location or into the soil.

The cover 36 is preferably disposed substantially at ground level L for ease in checking the quantity of treating agent in each holder 26. The holders 26 may be provided with upper end caps 54, if so desired, for preventing foreign material from falling into the respective holder magazine. The quantity of treating agent remaining in each holder can be readily checked by merely removing the cover 36, removing the cap 54 from the respective holder, and looking, or such checking may be accomplished by reaching down and withdrawing an entire holder out of the container.

Referring now to FIGS. 10 through 18, there is shown an extension member 56 which is adapted for mounting on the open upper end of the container of the aforementioned FIGS. 1 through 9 embodiment, to extend the effective height of the container, and thereby provide for use of the apparatus at a greater depth below ground level.

Figure 11:
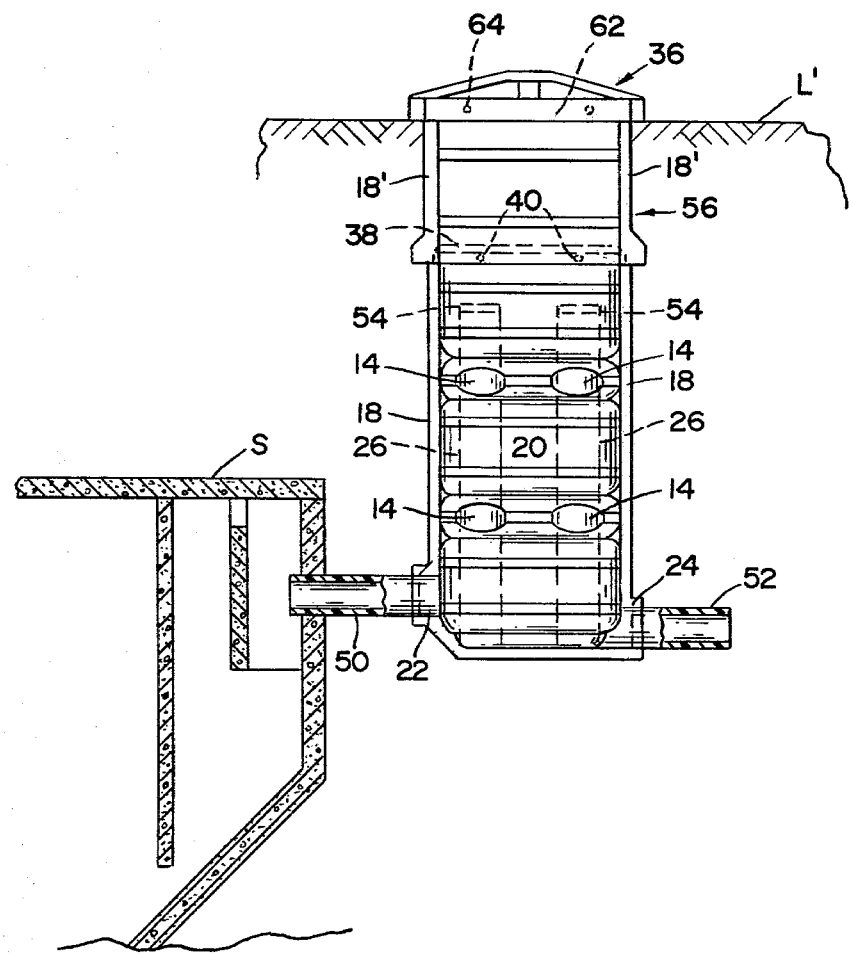
FIG. 11 is a diagrammatic illustration of the apparatus of the invention with the extension of FIG. 10 coupled thereto, and buried in the ground for receiving fluid from a septic tank system.
Figure 25:
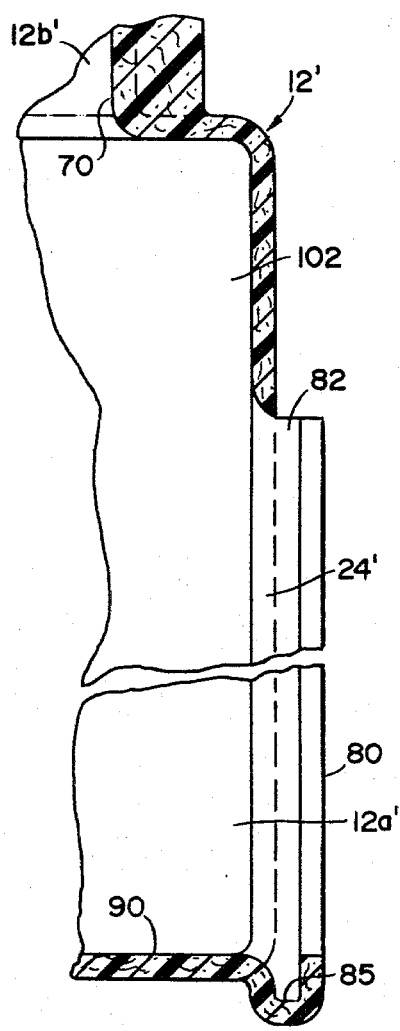
FIG. 25 is a diagrammatic sectional view taken generally along the plane of line 25—25 of FIG. 22.
Figure 26:
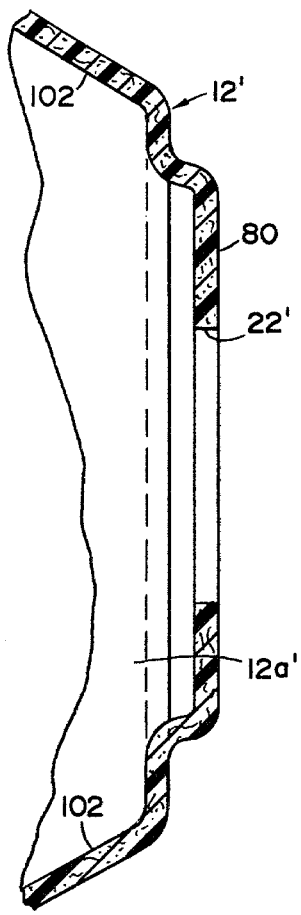
FIG. 26 is a sectional view taken generally along the plane of 26—26 of FIG. 23.
Figure 27:
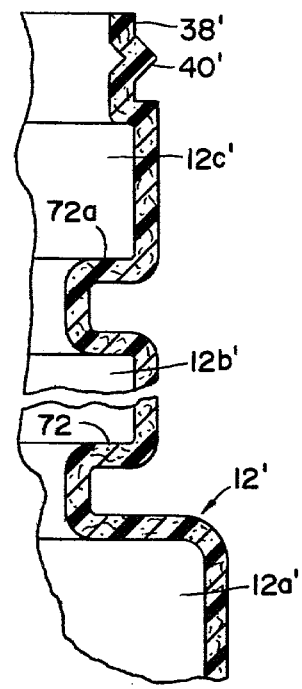
FIG. 27 is a sectional view taken generally along the plane of line 27—27 of FIG. 22, looking in the direction of the arrows.
Figure 28:
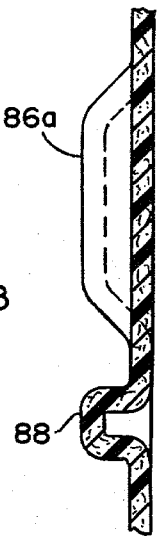
FIG. 28 is a sectional view taken generally along the plane of line 28—28 of FIG. 23, looking in the direction of the arrows.
Figure 29:
FIG. 29 is a sectional view taken generally along the plane of line 29—29 of FIG. 23, looking in the direction of the arrows.
Figure 30:
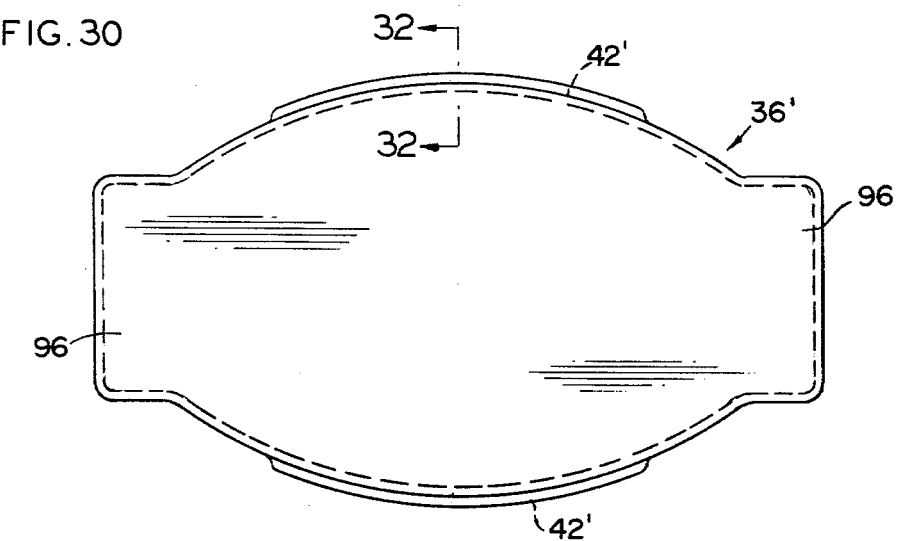
FIG. 30 is a top plan view of the cover for the FIG. 22 to FIG. 29 embodiment.
Figure 31:
FIG. 31 is an elevational view of the cover of FIG. 30.
Figure 32:
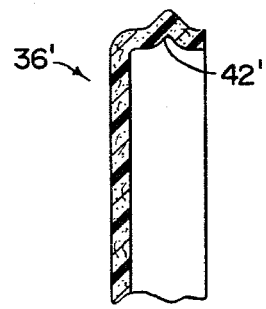
FIG. 32 is a fragmentary sectional view taken generally along the plane of line 32—32 of FIG. 30, looking in the direction of the arrows.

Extension member 56 is open both at the top and bottom, and is adapted to receive within its bottom periphery the aforementioned top flange 38 of the container proper, and as shown for instance in FIG. 11. The interior surface of the bottom opening 58 in the extension member 56 in the embodiment illustrated, is provided with indentations 60 which are adapted to receive the aforementioned projections 40 on the top flange 38 of the container 12, to releasably interlock the extension member to the upper end of container 12, and thus provide for extending the effective height of the container up to ground level L'. Such an arrangement may be used for instance when the septic tank system S is disposed at a greater depth below ground level L' as compared to the first embodiment illustrated. The upper end of the extension member 56 may be provided with a flange portion 62 which has projections 64 thereon which are adapted to be received within the interior recesses 42 on the cover 36, for releasably attaching the cover to the upper end of the extension member 56, and thus closing the open top of the extension member. Converging portions 66 on the lower end of the extension member merge with the respective end rib portion 18' and define a recess for receiving therein the upper end of the respective rib 18 on the container 12.

Referring now to FIGS. 19 through 32, there is illustrated another embodiment of fluid treating mechanism. In this embodiment, the lowermost chamber portion 12a' of the container 12' is of generally parallelepiped configuration while the other chamber portions 12b' and 12c' are of generally oblong configuration in plan (FIG. 22). The chamber portions are interconnected with openings 70, 70a, which are defined by constricted sections of the respective chamber portion with the defining wall surfaces providing supports 72, 72a disposed continuously along the interior surface of the respective chamber portion, and adapted to support thereon a respective support plate 76 (FIGS. 20–21) which is of oblong configuration, and receivable through the chamber portions onto the respective ledge support 72, 72a.

Each support plate has a plurality of openings 78 therein which are adapted to receive therethrough a respective treating agent holder member 26, similar in structure to the first described embodiment. It will be seen therefore, that in this embodiment, the support plates 76 provide vertically spaced support means for supporting the holder members 26 in predetermined position in the container 12', and for guiding the holder members into predetermined position during assembly of the treating agents holders with the containers.

The container outlet 22' in this embodiment, is provided with a bracket portion 80 disposed about the outlet opening and being open at the top thereof, as at 82 adapted to receive between the confronting wall of the chamber portion and the bracket a weir plate 84 (FIG. 19) which has a weir opening 84a therein, for varying the height of liquid in the outlet 22' of the mechanism. It will be understood that a plurality of weir plates having various size openings can be provided for the user, and that changing of the weir plate can be expeditiously accomplished by merely removing the weir plate from the bracket and inserting a new weir plate into the bracket and with the desired weir opening therein. The bracket preferably is recessed as at 85 (FIGS. 23 and 25) in its lower edge, to dispose the lower extremity of the weir opening in the plate 84 below the lower extremity of the outlet opening 22' from the mechanism.

Downstream from the inlet opening 24' of the mechanism there is preferably provided on each interior side wall of the container a pair of inwardly directed lugs 86, 86a which are oriented obliquely with respect to the vertical and an inwardly directed stop lug 88, disposed above the bottom surface 90 of the container. Between each pair of lugs 86, 86a there is adapted to be received a lateral section 92 of a baffle plate 94 (FIG. 19) which controls or restricts the free flow of liquid into the mechanism through the inlet opening 24'. The projections or lugs 86, 86a are preferably so disposed so as to maintain the baffle at a tilted angle of approximately 15° from the vertical, with the lugs 88 preventing engagement of the baffle plate with the bottom surface 90 of the container 12'.

The upper end of the container is open, as in the first described embodiment, and with the flange 38' thereof preferably embodying projections 40' thereon, adapted for interlocking coaction with recess 42' in the associated cover 36', for removably interlocking the cover to the open upper end of the container. The ends of the cover may be provided with enlarged grip portions 96 for facilitating removal of the cover. The mechanism of this embodiment is preferably formed of moldable plastic material similar to the first described embodiment, and has in general structural characteristics generally similar to those of the first described embodiment.

Feet portions 98 (FIGS. 19, 22, 23) may be provided for mounting on the underside of the container, for supporting the latter on a positioning surface. The feet portions may also be formed of moldable plastic material. Openings 100 in the feet portions may be used to anchor the mechanism to a supporting surface.

It will be seen that in this embodiment, the lower chamber portion 12a' preferably diverges as at 102 from the outlet into the wider portion of the chamber. The mounting pattern for the treating agent holders 26 in this embodiment is such that two treating agent holders are disposed generally adjacent the lateral side walls of the container, while the other two are in general alignment with the longitudinal vertical center plane of the container.

From the foregoing description and accompanying drawings, it will be seen that the invention provides a novel apparatus for treating fluids, emitted by, for instance, a septic tank, with the apparatus comprising a container having a fluid inlet and a fluid outlet with an elongated holding member adapted for holding a supply of treating agent, receivable completely within the container, and adapted to automatically feed the treating agent downwardly into contact with the fluid as the latter flows through the container via the inlet and the outlet, and wherein vertically spaced means are provided in the container for supporting the holding means in the container and for guiding the latter into predetermined position in the container upon assembly therewith. The invention also provides an extension member adapted for use with the container for extending the effective height of the container, so that the open upper end thereof can be substantially at ground level, thereby providing for use of the apparatus at different buried depths.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

What is claimed is:

1. Apparatus for treating a fluid with a treating agent comprising a container having at least three vertically spaced chambers, the lowermost one of said vertically spaced chambers having an inlet for introducing fluid thereinto and an outlet for discharging fluid therefrom, vertically spaced support means in said container, treating agent holding means removably insertable into said container and being supported in a generally vertical position by said vertically spaced support means, said vertically spaced support means comprising wall means defining generally vertically aligned openings communicating adjacent chambers with each other, said aligned openings receiving said treating agent holding means therethrough in the assembled condition of the latter with said container, said container being of a large enough size to completely receive said treating agent holding means therein.

2. An apparatus in accordance with claim 1 wherein said container is formed of moldable plastic material, such as high density polyethylene, said container being open at an upper end portion thereof and including a cover for closing said open upper end portion.

3. An apparatus in accordance with claim 1 wherein said wall means comprises generally cylindrical tubular-like sections, said holding means being of generally cylindrical-like hollow configuration and being receivable in generally loose relation through generally cylindrical tubular-like sections for exposure of the lower end of the holding means to fluid adapted to pass through said container.

4. An apparatus in accordance with claim 3 wherein said holding means is formed from moldable plastic material, and includes vertically extending slots in said lower end for facilitating exposure of associated treating agent to fluid adapted to pass through said container.

5. An apparatus in accordance with claim 3 wherein said spaced chambers each have formed ribs on the exterior thereof, said ribs extending generally horizontally about the exterior of the respective chamber and vertical ribs extending for substantially the full height of said container on the ends thereof and disposed substantially in the vertical plane of said inlet.

6. An apparatus in accordance with claim 3 wherein said lower end of said holding means rests on the interior of a bottom wall of said container, said holding means extends upwardly to a level below the upper end of said container, an upper end of said container being open, and including a removable cover closing said open upper end, removal of said cover exposing said cylindrical-like holding means for replenishing the associated treating agent.

7. An apparatus in accordance with claim 3 including means adapted for capping an open upper end of said hollow holding means.

8. An apparatus in accordance with claim 3 wherein said outlet is substantially flush with the bottom wall of said container, for aiding in the removal of the suspended matter from said apparatus.

9. An apparatus in accordance with claim 1 wherein said holding means comprises elongated cylindrical-like tubular members, the lower ends of said members being slotted and forming fingers thereon, said slotted structure being adapted to more fully expose associated treating agent to fluid flow through the container, and screen means disposed adjacent said lower end of each of said tubular members, said tubular members being adapted to receive a supply of chemical treating agent tablets in supported relation on said screen means, the tablets being adapted to move by gravity toward said lower end of said holding means when disposed therein, as fluid passing through said container dissolves the tablets at said lower end of the respective holding means.

10. An apparatus in accordance with claim 1 wherein an upper end of said container is open to provide access to said holding means therein and a cover for removably closing said open upper end, and means on said upper end of said container, for coaction with means on said cover for releasably holding said cover to said open end of said container.

11. An apparatus in accordance with claim 1 wherein said inlet is defined by a cylindrical pipe section, and means on said pipe section for limiting the inward movement from an associated pipe adapted to be received in said pipe section for coupling the apparatus to another mechanism.

12. An apparatus in accordance with claim 1 wherein said inlet and said outlet are disposed along the longitudinal vertical center plane of said container.

13. An apparatus in accordance with claim 1 wherein an upper end of said container is open to provide access to said holding means, extension means mountable on said open upper end of said container for extending the walls of said container to a higher elevation and having an open upper end and a cover removably closing said last mentioned open upper end.

14. An apparatus in accordance with claim 1 wherein one of said chambers is larger than the other of said chambers, said vertically spaced support means being removable from said container, and means on said container for supporting said vertically spaced support means in predetermined position in said container.

15. An apparatus in accordance with claim 1 wherein said vertically spaced support means comprises a plate-like member having apertures therethrough adapted to receive therethrough a respective treating agent holding means.

16. An apparatus in accordance with claim 1 including baffle means positioned in said container adjacent said inlet for restricting liquid flow prior to its movement through said outlet.

17. An apparatus in accordance with claim 1 including weir means coacting with said outlet for regulating the liquid height in said container.

18. An apparatus in accordance with claim 1 including bracket means on said container coacting with said outlet and adapted to receive said weir means therein for removably positioning said weir means in predetermined relation with respect to said outlet.

19. An apparatus in accordance with claim 1 wherein said container adjacent said outlet comprises a bracket open at the top thereof, and adapted to receive therein a weir plate for controlling the liquid height in said outlet, baffle means positioned in said container adjacent said inlet for restricting liquid flow prior to its movement through said outlet, and lug means formed on the interior of said container for maintaining said baffle means in oblique orientation and a predetermined amount above the bottom surface of said container.

* * * * *